United States Patent
Tanaka

(10) Patent No.: US 10,084,383 B2
(45) Date of Patent: Sep. 25, 2018

(54) BOOSTER DEVICE AND CONVERTER DEVICE

(71) Applicant: Mitsubishi Electric Corporation, Tokyo (JP)

(72) Inventor: Akito Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/538,069

(22) PCT Filed: Mar. 27, 2015

(86) PCT No.: PCT/JP2015/059681
§ 371 (c)(1),
(2) Date: Jun. 20, 2017

(87) PCT Pub. No.: WO2016/157307
PCT Pub. Date: Oct. 6, 2016

(65) Prior Publication Data
US 2017/0353109 A1    Dec. 7, 2017

(51) Int. Cl.
*G05F 1/00* (2006.01)
*H02M 3/158* (2006.01)
*H02M 1/00* (2006.01)

(52) U.S. Cl.
CPC .. *H02M 3/1584* (2013.01); *H02M 2001/0009* (2013.01); *H02M 2001/0025* (2013.01)

(58) Field of Classification Search
CPC .......... G05F 1/565; H02M 2001/0067; H02M 3/1584; H02M 2003/1586
USPC ................. 323/271, 272, 274, 284
See application file for complete search history.

(56) References Cited

U.S. PATENT DOCUMENTS

| | | | | |
|---|---|---|---|---|
| 5,861,734 A * | 1/1999 | Fasullo | ............... | H02M 1/4216 323/222 |
| 6,154,090 A * | 11/2000 | Wissmach | .......... | H02M 1/4208 327/311 |
| 7,279,868 B2 * | 10/2007 | Lanni | .................. | H02M 1/4208 323/222 |
| 7,884,588 B2 * | 2/2011 | Adragna | ............. | H02M 3/1584 323/272 |
| 2005/0036337 A1* | 2/2005 | Zhang | ................. | H02M 3/1584 363/17 |

(Continued)

FOREIGN PATENT DOCUMENTS

| | | |
|---|---|---|
| CN | 104135002 A | 11/2014 |
| EP | 3 168 972 A1 | 5/2017 |

(Continued)

OTHER PUBLICATIONS

International Search Report of the International Searching Authority dated Jun. 16, 2015 for the corresponding International application No. PCT/JP2015/059681 (and English translation).

(Continued)

*Primary Examiner* — Gary Nash
(74) *Attorney, Agent, or Firm* — Posz Law Group, PLC

(57) ABSTRACT

A booster device includes a shunt resistor with one end thereof being connected to a common bus on a low potential side and a plurality of booster circuits that are connected to one another in parallel and are connected between the other end of the shunt resistor and an input bus on a high potential side. The booster device can suppress its cost and mounting area.

1 Claim, 3 Drawing Sheets

(56) References Cited

U.S. PATENT DOCUMENTS

| | | |
|---|---|---|
| 2006/0007716 A1 | 1/2006 | Takahashi |
| 2008/0080008 A1 | 4/2008 | Yamamoto et al. |
| 2009/0303751 A1* | 12/2009 | Usui .................. H02M 1/4225 363/15 |
| 2010/0226149 A1* | 9/2010 | Masumoto .......... H02M 1/4225 363/20 |
| 2011/0132899 A1* | 6/2011 | Shimomugi ........ H02M 3/1584 219/620 |
| 2011/0291631 A1* | 12/2011 | Takahashi ........... H02M 1/4225 323/283 |
| 2012/0156505 A1 | 6/2012 | Shah et al. |
| 2012/0156506 A1 | 6/2012 | Shah et al. |
| 2012/0156507 A1 | 6/2012 | Shah et al. |
| 2013/0015786 A1* | 1/2013 | Sakae ................. H02M 1/4225 318/3 |
| 2013/0194848 A1* | 8/2013 | Bernardinis ........ H02M 3/1584 363/126 |
| 2013/0342139 A1* | 12/2013 | Shimomugi .......... H02M 7/066 318/400.3 |
| 2014/0169049 A1 | 6/2014 | Chandrasekaran |

FOREIGN PATENT DOCUMENTS

| | | |
|---|---|---|
| JP | 2004-297984 A | 10/2004 |
| JP | 2006-025579 A | 1/2006 |
| JP | 2007-098690 A | 4/2007 |
| JP | 2008-105406 A | 5/2008 |
| JP | 2008-259307 A | 10/2008 |
| JP | 2009-261079 A | 11/2009 |
| JP | 2011-239630 A | 11/2011 |
| JP | 2012-197419 A | 10/2012 |
| JP | 2014-054096 A | 3/2014 |

OTHER PUBLICATIONS

Extended European Search Report dated Feb. 23, 2017 issued in corresponding EP patent application No. 15864316.3.
Office Action dated Dec. 21, 2017 in the corresponding AU patent application No. 2015389306.
Office Action dated Jun. 5, 2018 issued in corresponding JP patent application No. 2017-508840 (and English machine translation).

\* cited by examiner

BOOSTER DEVICE AND CONVERTER DEVICE

CROSS REFERENCE TO RELATED APPLICATION

This application is a U.S. national stage application of International Patent Application No. PCT/JP2015/059681 filed on Mar. 27, 2015, the disclosure of which is incorporated herein by reference.

TECHNICAL FIELD

The present invention relates to a booster device that boosts a direct-current (DC) voltage and a converter device.

BACKGROUND

A booster converter circuit includes a rectifier circuit that converts alternating-current (AC) power into DC power, a booster circuit that includes a coil and a switching element and boosts a DC voltage output from the rectifier circuit, and a control circuit that executes pulse width modulation (PWM) control on the switching element.

As a related technique, Patent Literature 1 listed below describes a digital converter 1 in which three booster choppers 4a to 4c are connected to one another in parallel. In each of the booster choppers 4a to 4c, coils L1 to L3, switching elements Q1 to Q3, and shunt resistors R1 to R3 are respectively connected to one another in series. A one-chip microcomputer 3 sets a pulse width of a PWM wave based on a current Ipi at the time of transition respective switching elements to be OFF (paragraph 0013, paragraph 0021, and FIG. 1).

According to the digital converter 1 described in Patent Literature 1, the plurality of switching elements can be operated with an optimum condition while taking characteristics of each of the switching elements into consideration (paragraph 0017).

PATENT LITERATURE

Patent Literature 1: Japanese Patent Application Laid-open No. 2009-261079

However, in the digital converter 1 described in Patent Literature 1, the booster choppers 4a to 4c include the shunt resistors R1 to R3, respectively. Therefore, the digital converter 1 described in Patent Literature 1 has a large number of parts thus leading to cost increase and enlargement of mounting area thereof.

SUMMARY

The present invention has been achieved in view of the above problems, and an object of the present invention is to provide a booster device that can suppress its cost and mounting area.

To solve the above problems and achieve the object a booster device includes: a shunt resistor with one end thereof being connected to a common bus on a low potential side; and a plurality of booster circuits that are connected to one another in parallel and are connected between the other end of the shunt resistor and an input bus on a high potential side.

The booster device according to the present invention can suppress its cost and mounting area.

DETAILED DESCRIPTION

Exemplary embodiments of a booster device and a converter device according to the present invention will be explained below in detail with reference to the accompanying drawings. The present invention is not limited to the embodiments.

First Embodiment

Figure 1:
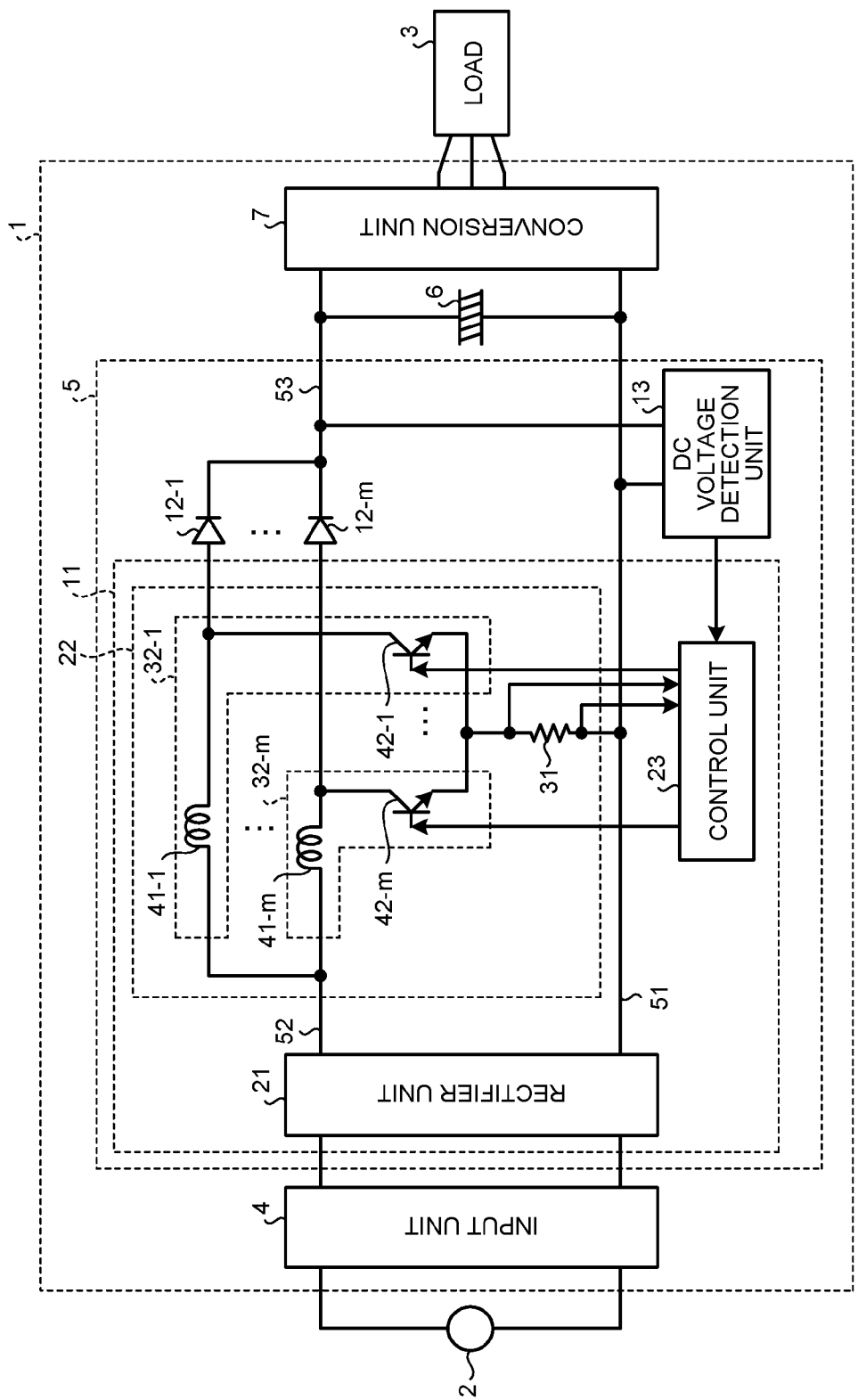
FIG. 1 is a diagram illustrating a configuration of a power supply device according to a first embodiment.

FIG. 1 is a diagram illustrating a configuration of a power supply device according to a first embodiment. A power supply device 1 converts AC power supplied from an AC power supply 2 into DC power, and further converts the DC power into AC power to drive a load 3. An electric motor is exemplified as the load 3.

The power supply device 1 includes: an input unit 4 to which AC power is input from the AC power supply 2; a conversion unit 5 that converts AC power having passed the input unit 4 into DC power; an electrolytic capacitor 6 that is a capacitive element smoothening a DC voltage output from the conversion unit 5; and a conversion unit 7 that converts DC power smoothened in the electrolytic capacitor 6 into AC power with a desired voltage and a desired frequency and supplies the AC power to the load 3.

A noise filter is exemplified as the input unit 4. The input unit 4 filters noise of AC power input from the AC power supply 2. A three-phase inverter device is exemplified as the conversion unit 7.

The conversion unit 5 includes: a converter device 11 that converts AC power having passed the input unit 4 into DC power; diodes 12-1 to 12-m (m is an integer equal to or larger than 2) that are rectifier elements in which an anode thereof is respectively connected to the converter device 11, and a cathode thereof is respectively connected to an output bus 53 on a high potential side of the cathode, and that suppress backflow of a current to the converter device 11; and a DC voltage detection unit 13 that detects a voltage between a common bus 51 on a low potential side and the output bus 53 on a high potential side.

The converter device 11 includes: a rectifier unit 21 that converts AC power having passed the input unit 4 into DC power; a booster device 22 that boosts a DC voltage output from the rectifier unit 21; and a control unit 23 that controls the booster device 22.

A diode bridge is exemplified as the rectifier unit 21. The rectifier unit 21 performs full wave rectification on AC power having passed the input unit 4 and outputs DC power.

A CPU (Central Processing Unit) or a microcomputer is exemplified as the control unit 23. A voltage value between the common bus 51 and the output bus 53 is input to the control unit 23 from the DC voltage detection unit 13.

The booster device 22 includes: a shunt resistor 31 with one end thereof being connected to the common bus 51; and booster circuits 32-1 to 32-m (m is an integer equal to or larger than 2) that are connected to one another in parallel and are connected between the other end of the shunt resistor 31 and an input bus 52 on a high potential side.

The shunt resistor 31 is a resistor that detects a current flowing in the booster circuits 32-1 to 32-m. The control unit 23 calculates a current flowing in the shunt resistor 31 based on a voltage between both terminals of the shunt resistor 31. In the first embodiment, the current flowing in the shunt resistor 31 is referred to as "shunt current".

The booster circuit 32-1 includes a coil 41-1 that is an inductive element with one end thereof being connected to the input bus 52, and a switching element 42-1 with an input-output path thereof being connected between the other end of the coil 41-1 and the other end of the shunt resistor 31. That is, the coil 41-1 and the switching element 42-1 are connected in series. A control terminal of the switching element 42-1 is connected to the control unit 23, and the switching element 42-1 is PWM-controlled by the control unit 23.

A DC voltage boosted by the booster circuit 32-1 is output from a connection point between the coil 41-1 and the switching element 42-1. An anode of the diode 12-1 is connected to the connection point between the coil 41-1 and the switching element 42-1.

The booster circuit 32-m includes a coil 41-m that is an inductive element with one end thereof being connected to the input bus 52, and a switching element 42-m with an input-output path thereof being connected between the other end of the coil 41-m and the other end of the shunt resistor 31. That is, the coil 41-m and the switching element 42-m are connected in series. A control terminal of the switching element 42-m is connected to the control unit 23, and the switching element 42-m is PWM-controlled by the control unit 23.

A DC voltage boosted by the booster circuit 32-m is output from a connection point between the coil 41-m and the switching element 42-m. An anode of the diode 12-m is connected to the connection point between the coil 41-m and the switching element 42-m.

It is preferable that the coils 41-1 to 41-m have a core with small harmonic iron loss. The coils 41-1 to 41-m may be selected in consideration of elements such as their control method, efficiency, temperature, quantity, or size.

An IGBT (Insulated Gate Bipolar Transistor) or a MOSFET (Metal-Oxide-Semiconductor Field-Effect Transistor) may be used for the switching elements 42-1 to 42-m.

The control unit 23 controls the switching elements 42-1 to 42-m to be an on-state in sequence. That is, the switching elements 42-1 to 42-m are not in an on-state simultaneously.

Operations of the power supply device 1 are described. In an initial state, the control unit 23 does not perform switching of the switching elements 42-1 to 42-m. A voltage value between the common bus 51 and the output bus 53 is input from the DC voltage detection unit 13 to the control unit 23.

The control unit 23 compares a voltage between the common bus 51 and the output bus 53 with a target voltage set in advance. When the voltage between the common bus 51 and the output bus 53 is higher than the target voltage, the control unit 23 causes short-circuits in the switching elements 42-1 to 42-m.

On the other hand, when the voltage between the common bus 51 and the output bus 53 is lower than the target voltage, the control unit 23 stops switching of the switching elements 42-1 to 42-m.

Meanwhile, also when the voltage between the common bus 51 and the output bus 53 is equal to the target voltage, the control unit 23 stops switching of the switching elements 42-1 to 42-m.

In the power supply device 1, due to electrical characteristics or circuit patterns of the coils 41-1 to 41-m and the switching elements 42-1 to 42-m, there may be fluctuations in the currents flowing in the booster circuits 32-1 to 32-m.

The control unit 23 executes a PWM control on the switching of the switching elements 42-1 to 42-m. Therefore, based on the timing of an on-period of a PWM signal to be applied to the switching elements 42-1 to 42-m, the control unit 23 can determine in which booster circuit, among the booster circuits 32-1 to 32-m, a current that flows in the shunt resistor 31 is currently flowing.

Figure 2:
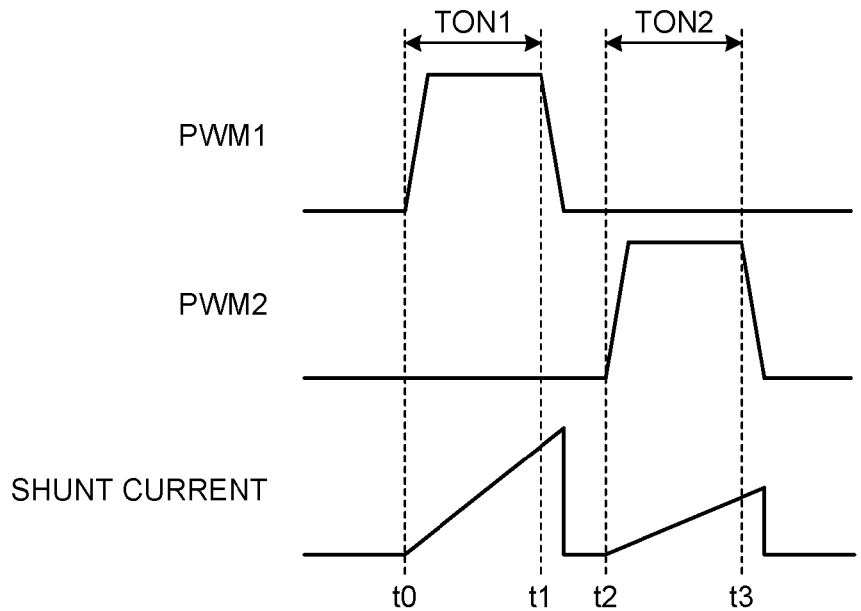
FIG. 2 is a diagram illustrating an example of a signal waveform of the power supply device according to the first embodiment.

FIG. 2 is a diagram illustrating an example of a signal waveform of the power supply device according to the first embodiment. In the first embodiment, a PWM signal to be applied to the switching element 42-1 is referred to as "signal PWM1", and a PWM signal to be applied to the switching element 42-m is referred to as "signal PWM2".

As illustrated in FIG. 2, at a timing t0, when the signal PWM1 starts to rise, a shunt current, which is a current flowing in the booster circuit 32-1, starts to rise.

At a timing t1, when the signal PWM1 starts to fall, the shunt current, which is the current flowing in the booster circuit 32-1, starts to fall.

At a timing t2, when the signal PWM2 starts to rise, a shunt current, which is a current flowing in the booster circuit 32-m, starts to rise.

At a timing t3, when the signal PWM2 starts to fall, the shunt current, which is the current flowing in the booster circuit 32-m, starts to fall.

In this example, a time TON1 that is a time from the timings t0 to t1 and a time TON2 that is a time from the timings t2 and t3 are the same.

As illustrated in FIG. 2, even when the time TON1 and the time TON2 are the same, due to electrical characteristics or circuit patterns of the coils 41-1 to 41-m and the switching elements 42-1 to 42-m, there may be fluctuations in the currents flowing in the booster circuits 32-1 to 32-m.

In FIG. 2, the current flowing in the booster circuit 32-1 is larger than the current flowing in the booster circuit 32-m.

The control unit 23 compares shunt currents detected at different timings, which are currents flowing in the booster circuits 32-1 to 32-m. When there are fluctuations in the currents flowing in the booster circuits 32-1 to 32-m, the control unit 23 corrects pulse widths of a plurality of PWM signals so that an on-time of a switching element of a booster circuit among the booster circuits 32-1 to 32-m having a smaller current is elongated and an on-time of a switching element of a booster circuit among the booster circuits 32-1 to 32-m having a larger current is shortened. The control unit 23 controls switching of the switching elements 42-1 to 42-m with a plurality of corrected PWM signals.

Figure 3:
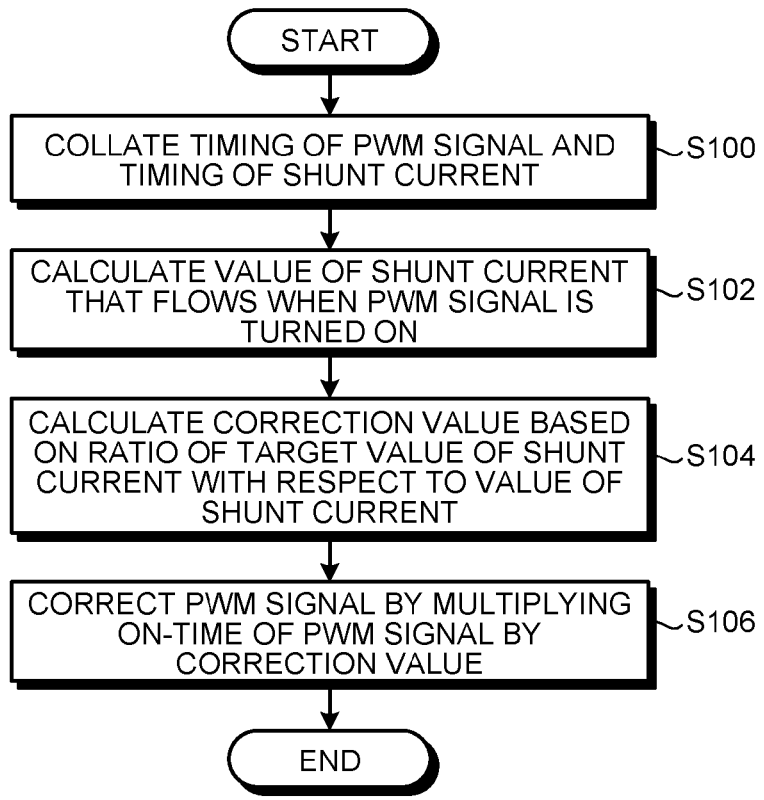
FIG. 3 is a flowchart illustrating an operation of the power supply device according to the first embodiment.

FIG. 3 is a flowchart illustrating an operation of the power supply device according to the first embodiment. The flowchart illustrated in FIG. 3 represents an operation of the power supply device 1 for suppressing fluctuations of currents flowing in the booster circuits 32-1 to 32-m.

At Step S100, the control unit 23 collates timings of an on-time of a plurality of PWM signals applied to the switching elements 42-1 to 42-m and timings of shunt currents. With this collation, the control unit 23 determines in which booster circuit, among the booster circuits 32-1 to 32-m, the shunt currents at respective timings flow.

At Step S102, the control unit 23 calculates a value of a shunt current that flows when a plurality of PWM signals to be applied to the switching elements 42-1 to 42-m are turned on. Specifically, the control unit 23 calculates a shunt current when a plurality of PWM signals to be applied to the switching elements 42-1 to 42-m rise and a shunt current when said plurality of PWM signals fall. Thereafter, by subtracting the shunt current when respective PWM signals rise from the shunt current when respective PWM signals fall, the control unit 23 calculates an increase amount of the shunt current at an on-time of the respective PWM signals.

As described above, by calculating an increase amount of the shunt current at an on-time of the respective PWM signals, the control unit 23 can eliminate offset components and calculate the shunt current at an on-time of the respective PWM signals with high accuracy.

Specifically, the control unit 23 calculates a shunt current value IU1 when the signal PWM1 rises and a shunt current value ID1 when the signal PWM1 falls. Subsequently, by subtracting the shunt current value IU1 when the signal PWM1 rises from the shunt current value ID1 when the signal PWM1 falls, the control unit 23 calculates an increase amount ID1-IU1 of the shunt current value at an on-time of the signal PWM1.

Similarly, the control unit 23 calculates a shunt current value IU2 when the signal PWM2 rises and a shunt current value ID2 when the signal PWM2 falls. Subsequently, by subtracting the shunt current IU2 when the signal PWM2 rises from the shunt current ID2 when the signal PWM2 falls, the control unit 23 calculates an increase amount ID2-IU2 of the shunt current at an on-time of the signal PWM2.

At Step S104, the control unit 23 calculates a plurality of correction values for correcting a plurality of PWM signals based on the ratio of a predetermined target value of a shunt current with respect to the value of a shunt current that flows when a plurality of PWM signals to be applied to the switching elements 42-1 to 42-m are turned on.

Specifically, with the equation (1), the control unit 23 calculates a correction value M1, which is the ratio of a target value IS of a shunt current with respect to the calculated shunt current value ID1-IU1.

$$M1=IS/(ID1-IU1) \quad (1)$$

Similarly, with the equation (2), the control unit 23 calculates a correction value M2, which is the ratio of a target value IS of a shunt current with respect to the calculated shunt current value ID2-IU2.

$$M2=IS/(ID2-IU2) \quad (2)$$

At Step S106, by multiplying an on-time of a plurality of PWM signals to be applied to the switching elements 42-1 to 42-m by a plurality of correction values, the control unit 23 corrects the plurality of PWM signals.

Specifically, by multiplying the on-time TON1 of the signal PWM1 by the correction value M1, the control unit 23 corrects the on-time of the signal PWM1 to be TON1×M1.

Similarly, by multiplying the on-time TON2 of the signal PWM2 by the correction value M2, the control unit 23 corrects the on-time of the signal PWM2 to be TON2×M2.

Figure 4:
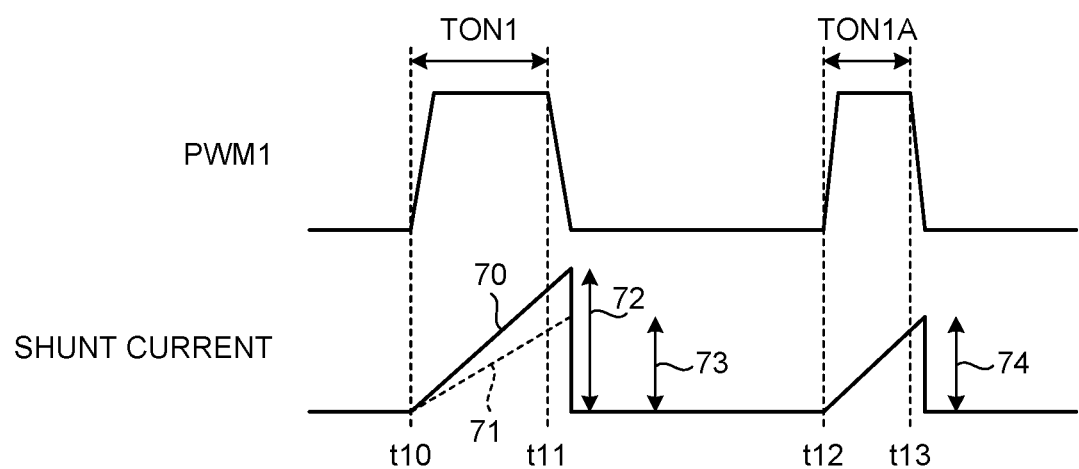
FIG. 4 is a diagram illustrating an example of a signal waveform of the power supply device according to the first embodiment.

FIG. 4 is a diagram illustrating an example of a signal waveform of the power supply device according to the first embodiment. As illustrated in FIG. 4, at a timing t10, when the signal PWM1 starts to rise, a shunt current, which is a current flowing in the booster circuit 32-1, starts to rise.

At a timing t11, when the signal PWM1 starts to fall, a shunt current, which is a current flowing in the booster circuit 32-1, starts to fall.

At this time, a waveform 70 of the current flowing in the booster circuit 32-1 exceeds a waveform 71 of a target current. Therefore, by correcting the time TON1 to be shorter, the control unit 23 executes control of approximating the current value of the current flowing in the booster circuit 32-1 to a target current value.

The control unit 23 calculates the shunt current value IU1 when the signal PWM1 rises and the shunt current value ID1 when the signal PWM1 falls. Subsequently, by subtracting the shunt current value IU1 when the signal PWM1 rises from the shunt current value ID1 when the signal PWM1 falls, the control unit 23 calculates an increase amount 72 of the shunt current value at an on-time of the signal PWM1.

The control unit 23 calculates a plurality of correction values for correcting a plurality of PWM signals based on the ratio of a predetermined target value of a shunt current with respect to the value of a shunt current that flows when a plurality of PWM signals to be applied to the switching element 42-1 are turned on.

Specifically, with the equation (1) mentioned above, the control unit 23 calculates the correction value M1, which is the ratio of a target value 73 of a shunt current with respect to the calculated shunt current value 72.

By multiplying the on-time TON1 of the signal PWM1 applied to the switching element 42-1 by the correction value M1, the control unit 23 corrects the on-time TON1 of the signal PWM1 to be an on-time TON1A.

Referring back to FIG. 4, when the signal PWM1 starts to rise at a timing t12, a shunt current, which is a current flowing in the booster circuit 32-1, starts to rise.

At a timing t13, when the signal PWM1 starts to fall, a shunt current, which is a current flowing in the booster circuit 32-1, starts to fall.

At this time, the control unit 23 corrects the on-time TON1A of the signal PWM1 to be shorter than the on-time TON1 before correction. Therefore, the control unit 23 can execute control of approximating a current value 74 of a current flowing in the booster circuit 32-1 to a target current value.

As described above, even when there are fluctuations in the currents flowing in the booster circuits 32-1 to 32-m due to electrical characteristics or circuit patterns of the coils 41-1 to 41-m and the switching elements 42-1 to 42-m, by correcting the PWM signals to be applied to the switching elements 42-1 to 42-m, the power supply device 1 can approximate the values of the currents flowing in the booster circuits 32-1 to 32-m to a target current value.

In this manner, because the power supply device 1 can approximate the currents flowing in the booster circuits 32-1 to 32-m to a target current value, it is possible to suppress concentration of currents in certain elements and to suppress unevenness of heat generation or power loss amount.

Furthermore, the power supply device 1 includes one shunt resistor 31 between the common bus 51 and the booster circuits 32-1 to 32-m. Therefore, the power supply device 1 can suppress the number of parts and suppress its cost and mounting area.

The configuration described in the above embodiment is only an example of the contents of the present invention. The configuration can be combined with other well-known techniques, and it is needless to mention that the present invention can be configured while modifying it without departing from the scope of the invention, such as omitting a part of the configuration.

The invention claimed is:
1. A converter comprising:
    a booster including
        a shunt resistor with one end thereof being connected to a common bus on a low potential side, and a plurality of booster circuitries connected to one another in parallel and are connected between the other end of the shunt resistor and an input bus on a high potential side; and a controller to execute pulse-width modulation control on the plurality of booster circuitries, wherein the plurality of booster circuitries respectively include a coil with one end thereof being connected to the input bus on the high potential side and a switching element with an input-output path thereof being connected between the other end of the coil and the other end of the shunt resistor and with a control terminal thereof having a pulse-width modulation signal applied thereto from the controller, and the controller collates a timing of an on-time of a pulse-width modulation signal to be applied to the switching element and a timing of a current flowing in the shunt resistor so as to determine in which booster circuitry, among the plurality of booster circuitries, a current that flows in the shunt resistor flows, and corrects the pulse-width modulation signal based on a ratio of a predetermined target current value with respect to a value of a current that flows in the shunt resistor when the pulse-width modulation signal to be applied to the switching element is turned on, thereby executing control of approximating the plurality of currents flowing in the plurality of booster circuitries to the one target current value.

* * * * *